(12) United States Patent
Bangerter et al.

(10) Patent No.: US 10,197,285 B2
(45) Date of Patent: Feb. 5, 2019

(54) GAS TURBINE ENGINE WALL ASSEMBLY INTERFACE

(71) Applicant: United Technologies Corporation, Farmington, CT (US)

(72) Inventors: James P. Bangerter, Manchester, CT (US); Thomas R. Russo, Bristol, CT (US); Russell B. Hanson, Jupiter, FL (US); Kevin J. Low, Portland, CT (US)

(73) Assignee: United Technologies Corporation, Farmington, CT (US)

( * ) Notice: Subject to any disclaimer, the term of this patent is extended or adjusted under 35 U.S.C. 154(b) by 414 days.

(21) Appl. No.: 15/038,847

(22) PCT Filed: Aug. 29, 2014

(86) PCT No.: PCT/US2014/053492
§ 371 (c)(1),
(2) Date: May 24, 2016

(87) PCT Pub. No.: WO2015/084444
PCT Pub. Date: Jun. 11, 2015

(65) Prior Publication Data
US 2016/0377296 A1 Dec. 29, 2016

Related U.S. Application Data

(60) Provisional application No. 61/912,878, filed on Dec. 6, 2013.

(51) Int. Cl.
*F23R 3/60* (2006.01)
*F02K 1/82* (2006.01)
(Continued)

(52) U.S. Cl.
CPC .................. *F23R 3/60* (2013.01); *F02C 3/04* (2013.01); *F02C 7/24* (2013.01); *F02K 1/822* (2013.01);
(Continued)

(58) Field of Classification Search
CPC .... F23R 3/60; F23R 3/002; F23R 3/06; F23R 2900/00018; F23R 2900/03042;
(Continued)

(56) References Cited

U.S. PATENT DOCUMENTS 4,302,941 A * 12/1981 DuBell .................... F23R 3/002
60/757
5,758,503 A * 6/1998 DuBell .................... F23R 3/002
60/752

(Continued)

OTHER PUBLICATIONS

Extended EP Search Report dated Dec. 14, 2016.

*Primary Examiner* — Jason Newton
(74) *Attorney, Agent, or Firm* — O'Shea Getz P.C.

(57) ABSTRACT

A wall assembly is provided for a gas turbine engine. This wall assembly includes a support shell with a contoured region; and a multiple of liner panels mounted to the support shell. At least one of the multiple of liner panels includes an end rail. The contoured region is deformable to selectively contact at least a portion of the end rail. A method of assembling a wall assembly within a gas turbine engine is also provided. This method includes locating a stud that extends from a cold side of a liner panel through a support shell; and attaching a fastener onto the stud to at least partially close a gap defined between the panel and shell.

20 Claims, 11 Drawing Sheets

(51) Int. Cl.
*F02C 7/24* (2006.01)
*F23R 3/00* (2006.01)
*F23R 3/06* (2006.01)
*F02C 3/04* (2006.01)
*F23M 5/04* (2006.01)

(52) U.S. Cl.
CPC ............... *F23M 5/04* (2013.01); *F23R 3/002* (2013.01); *F23R 3/06* (2013.01); *F05D 2260/30* (2013.01); *F23R 2900/00018* (2013.01); *F23R 2900/03042* (2013.01); *Y02T 50/675* (2013.01)

(58) Field of Classification Search
CPC ..... F02C 3/04; F02C 7/24; F23M 5/04; F02K 1/822; Y02T 50/675; F05D 2260/30
USPC ........................................................... 60/752
See application file for complete search history.

(56) References Cited

U.S. PATENT DOCUMENTS

| | | | |
|---|---|---|---|
| 6,837,051 B2* | 1/2005 | Mandai | F23R 3/005 60/725 |
| 7,140,185 B2* | 11/2006 | Burd | F23M 5/085 60/752 |
| 8,800,298 B2* | 8/2014 | Ladd | F23R 3/002 60/792 |
| 9,909,761 B2* | 3/2018 | Cunha | F23R 3/002 |
| 2005/0086940 A1* | 4/2005 | Coughlan, III | F23R 3/002 60/752 |
| 2007/0113557 A1 | 5/2007 | Shcmacher et al. | |
| 2010/0077764 A1* | 4/2010 | Dierberger | F23R 3/002 60/754 |
| 2010/0095679 A1 | 4/2010 | Rudrapatna et al. | |
| 2010/0242485 A1 | 9/2010 | Davis, Jr. et al. | |
| 2010/0263386 A1* | 10/2010 | Edwards | F23R 3/002 60/796 |
| 2011/0203286 A1* | 8/2011 | Wagner | F23C 3/00 60/752 |
| 2013/0000309 A1* | 1/2013 | Dierberger | F23R 3/002 60/752 |
| 2013/0251513 A1 | 9/2013 | Stastny et al. | |
| 2015/0362192 A1 | 12/2015 | Cunha et al. | |
| 2015/0369490 A1* | 12/2015 | Cunha | F23R 3/002 29/428 |
| 2016/0040879 A1* | 2/2016 | Dierberger | F23R 3/002 60/782 |
| 2016/0201511 A1* | 7/2016 | Chang, Jr. | F01D 25/24 415/1 |
| 2016/0201909 A1* | 7/2016 | Bangerter | F02C 3/14 60/772 |
| 2016/0377296 A1* | 12/2016 | Bangerter | F02K 1/822 60/752 |
| 2017/0159935 A1* | 6/2017 | Drake | F01D 25/12 |
| 2017/0159936 A1* | 6/2017 | Cunha | F23R 3/005 |
| 2018/0231251 A1* | 8/2018 | Burd | F23R 3/007 |

* cited by examiner

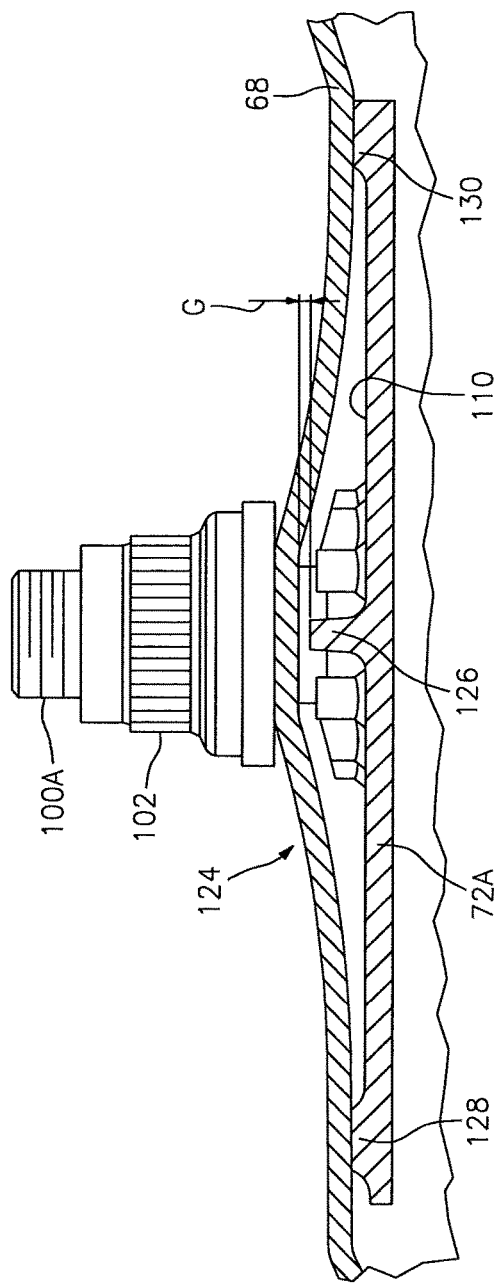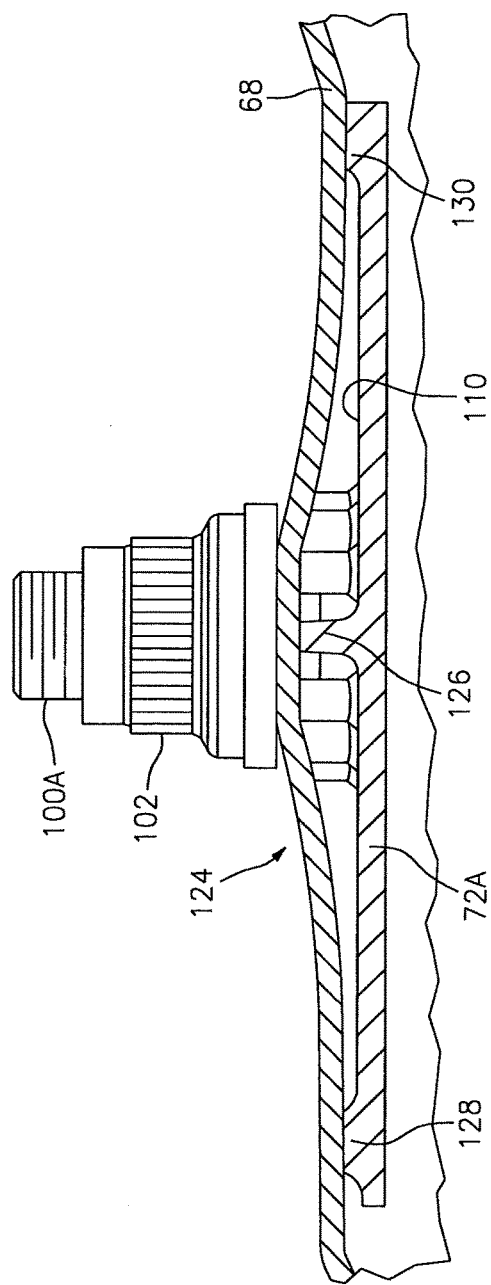

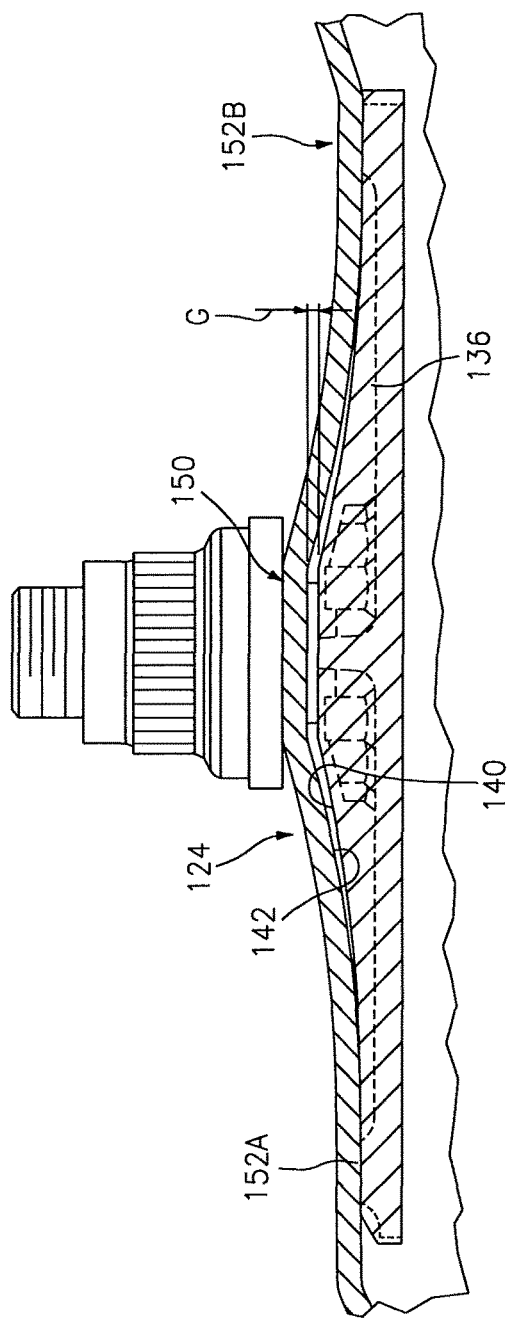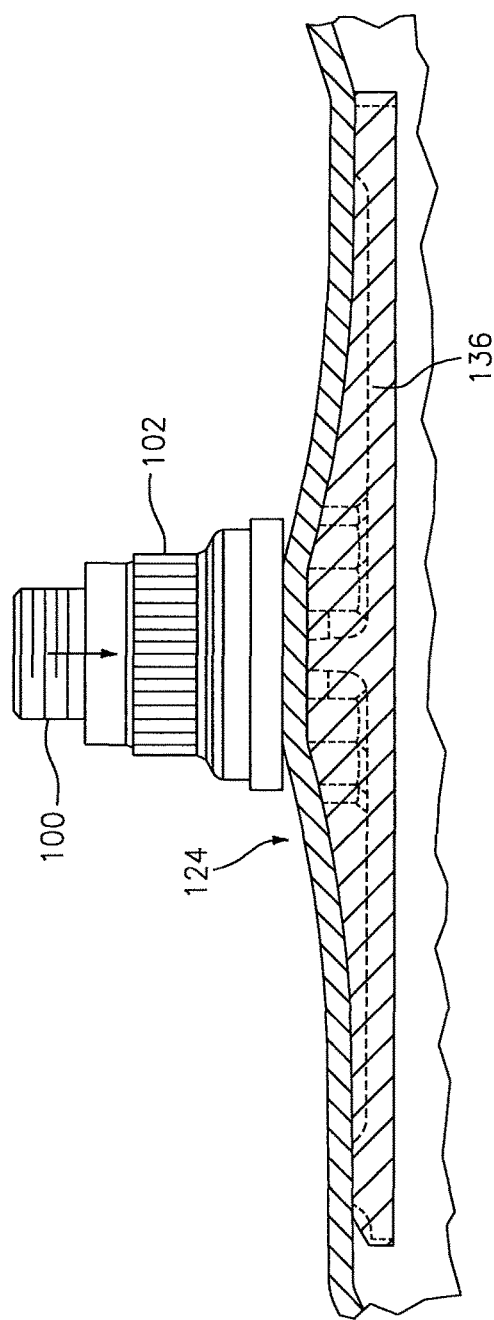

GAS TURBINE ENGINE WALL ASSEMBLY INTERFACE

CROSS-REFERENCE TO RELATED APPLICATION

This application claims priority to PCT Patent Application No. PCT/US14/053492 filed Aug. 29, 2014, which claims priority to U.S. Patent Appln. Ser. No. 61/912,878 filed Dec. 6, 2013, which are hereby incorporated herein by reference in their entireties.

BACKGROUND

The present disclosure relates to a gas turbine engine and, more particularly, to a hot section component therefor.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

Among the engine components, relatively high temperatures are observed in the combustor section such that cooling is required to meet service life requirements. The combustor section typically includes an outer shell lined with heat shields often referred to as floatwall panels. In certain arrangements, dilution holes in the floatwall panel communicate with respective dilution holes in the outer shell to direct cooling air for dilution of the combustion gases. In addition to the dilution holes, the outer shell may also have relatively smaller air impingement holes to direct cooling air between the floatwall panels and the outer shell to cool the cold side of the floatwall panels. This cooling air exits effusion holes through of the floatwall panels to form a film on a hot side of the floatwall panels as a barrier against the hot combustion gases.

With lower emission requirements and higher combustor temperatures, the amount of cooling is reduced while the effectiveness thereof is increased. A challenge related to this concept is that there is a higher pressure drop across the combustor panel. This higher pressure drop may result in increased sensitivity to leakage.

SUMMARY

A wall assembly for a gas turbine engine, according to one disclosed non-limiting embodiment of the present disclosure, includes a support shell with a contoured region. The wall assembly also includes a multiple of liner panels mounted to the support shell. At least one of the multiple of liner panels includes an end rail. The contoured region is deformable to selectively contact at least a portion of the end rail.

In a further embodiment of the present disclosure, the portion of the end rail and the contoured region of the support shell define a gap when the contoured region is in a first position.

In a further embodiment of any of the foregoing embodiments of the present disclosure, the portion of the end rail and the contoured region of the support shell form a seal when the contoured region is in a second position.

In a further embodiment of any of the foregoing embodiments of the present disclosure, the contoured region is centered with respect to an intermediate circumferential rail of the at least one of the multiple of liner panels.

In a further embodiment of any of the foregoing embodiments of the present disclosure, a perimeter rail is included that defines a first height from a cold side of the at least one liner panel. The intermediate rail defines a second height from the cold side. The second height is less than the first height.

In a further embodiment of any of the foregoing embodiments of the present disclosure, a multiple of studs are included that extend from each of the multiple of liner panels.

In a further embodiment of any of the foregoing embodiments of the present disclosure, the multiple of studs extend from the at least one of the multiple of liner panels generally along the intermediate circumferential rail.

A wall assembly for a gas turbine engine, according to another disclosed non-limiting embodiment of the present disclosure, includes a support shell with a contoured region; a multiple of liner panels mounted to the support shell; and a multiple of fasteners mounted to the at least one of the multiple of liner panels. At least one of the multiple of liner panels includes a first and second end rail. The multiple of fasteners are operable to deform the contoured region to seal the support shell to the first and second end rail.

In a further embodiment of any of the foregoing embodiments of the present disclosure, a multiple of studs are included that extend from the at least one of the multiple of liner panels through the support shell. Each of the multiple of fasteners respectively received onto one of the multiple of studs.

In a further embodiment of any of the foregoing embodiments of the present disclosure, the contoured region is centered with respect to an intermediate circumferential rail of the at least one of the multiple of liner panels.

In a further embodiment of any of the foregoing embodiments of the present disclosure, the liner panel is mounted within a combustor of the gas turbine engine.

In a further embodiment of any of the foregoing embodiments of the present disclosure, the first and the second end rails form a portion of a perimeter rail.

In a further embodiment of any of the foregoing embodiments of the present disclosure, the perimeter rail surrounds an intermediate rail.

In a further embodiment of any of the foregoing embodiments of the present disclosure, the perimeter rail includes a forward circumferential rail and an aft circumferential rail connected to the first and second end rails. The first and second end rails each include an engagement area in contact with the support shell when the contoured region of the support shell is in a first position and when the contoured region is in a second position sealed with the first and second end rail.

In a further embodiment of any of the foregoing embodiments of the present disclosure, the intermediate rail is generally parallel to the forward circumferential rail and the aft circumferential rail.

In a further embodiment of any of the foregoing embodiments of the present disclosure, the intermediate rail extends less than the forward circumferential rail and the aft circumferential rail by about 0.005-0.020 inches (0.1-0.5 mm).

A method of assembling a wall assembly within a gas turbine engine, according to another disclosed non-limiting embodiment of the present disclosure, includes locating a stud that extends from a cold side of a liner panel through a support shell; and attaching a fastener onto the stud to at least partially close a gap defined between the panel and shell.

In a further embodiment of any of the foregoing embodiments of the present disclosure, the method includes at least partially closing the gap includes elastically deforming the support shell toward the liner panel.

In a further embodiment of any of the foregoing embodiments of the present disclosure, the support shell includes a contoured region and the panel includes a rail. The rail and the contoured region define a gap when the contoured region is in a first position and contact one another when the contoured region is in a second position.

In a further embodiment of any of the foregoing embodiments of the present disclosure, the method includes defining the gap adjacent to an intermediate rail.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows:

FIG. 10 is an expanded longitudinal sectional view of a forward outer portion of a combustor wall assembly illustrating a gap according to one disclosed non-limiting embodiment with a contoured region of the shell in a first relaxed position;

FIG. 11 is an expanded longitudinal sectional view of a forward outer portion of a combustor wall assembly illustrating the contoured region of the shell in a second deformed position, closing the gap of FIG. 10;

FIG. 12 is an expanded longitudinal sectional view of a forward outer portion of a combustor wall assembly illustrating the gap between the end rail and the contoured region of the shell in the first relaxed position; and FIG. 13 is an expanded longitudinal sectional view of a forward outer portion of a combustor wall assembly illustrating the contoured region of the shell in a second deformed position, closing the gap.

DETAILED DESCRIPTION

Figure 1:
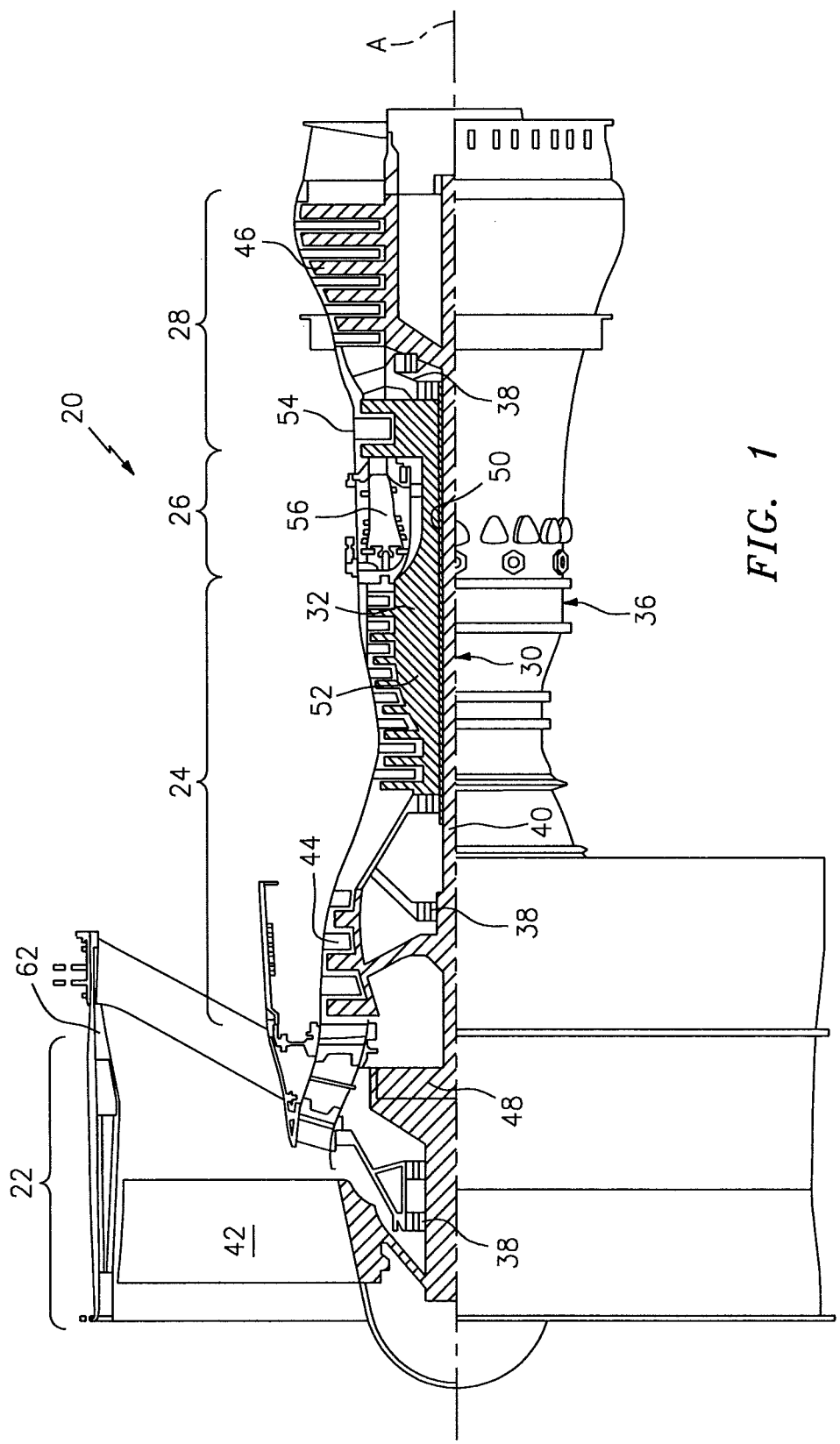
FIG. 1 is a schematic cross-section of an example gas turbine engine architecture.
Figure 2:
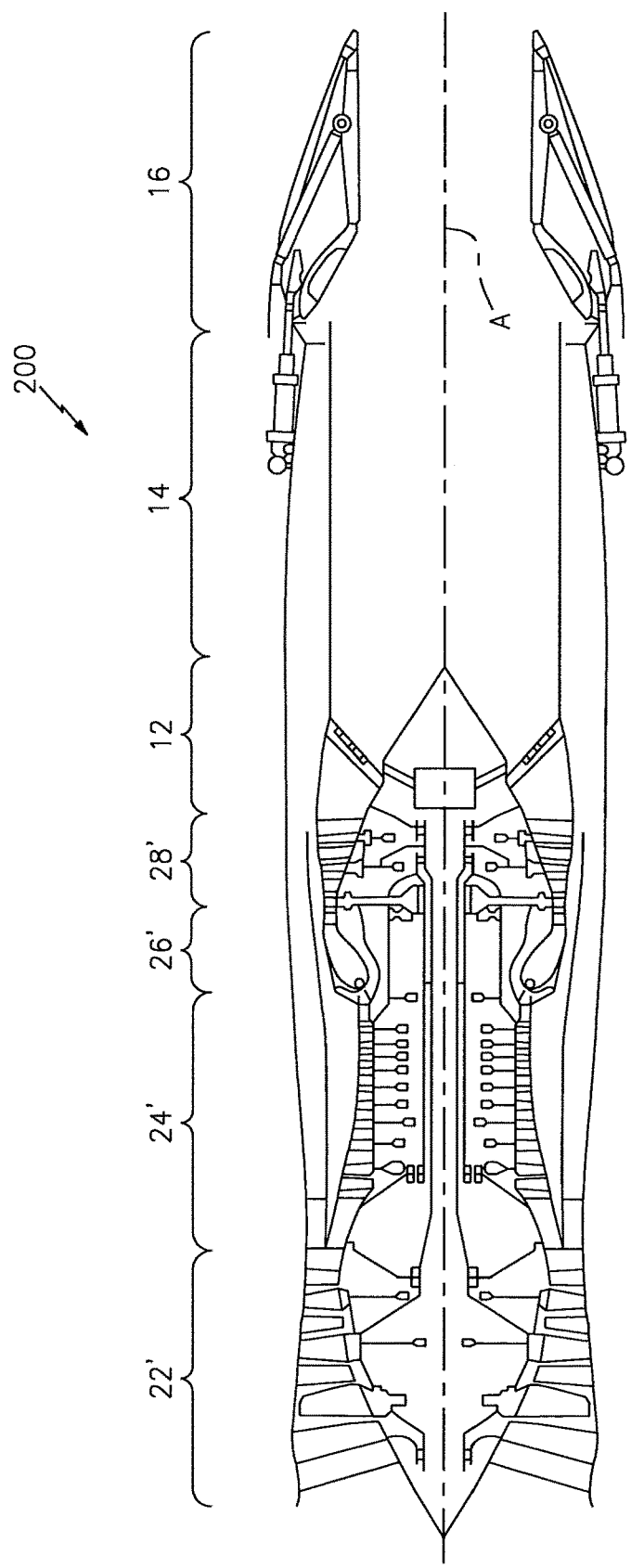
FIG. 2 is a schematic cross-section of another example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Referring to FIG. 2, alternative engine architectures 200 might include an augmentor section 12, an exhaust duct section 14 and a nozzle section 16 in addition to the fan section 22', compressor section 24', combustor section 26' and turbine section 28' among other systems or features. Referring again to FIG. 1, the fan section 22 drives air along a bypass flowpath and into the compressor section 24. The compressor section 24 drives air along a core flowpath for compression and communication into the combustor section 26, which then expands and directs the air through the turbine section 28. Although depicted as a turbofan in the disclosed non-limiting embodiment, it should be understood that the concepts described herein are not limited to use with turbofans as the teachings may be applied to other types of turbine engines such as a turbojets, turboshafts, and three-spool (plus fan) turbofans wherein an intermediate spool includes an Intermediate Pressure Compressor ("IPC") between a Low Pressure Compressor ("LPC") and a High Pressure Compressor ("HPC"), and an Intermediate Pressure Turbine ("IPT") between a High Pressure Turbine ("HPT") and a Low Pressure Turbine ("LPT").

The engine 20 generally includes a low spool 30 and a high spool 32 mounted for rotation about an engine central longitudinal axis A relative to an engine static structure 36 via several bearing structures 38 or systems. The low spool 30 generally includes an inner shaft 40 that interconnects a fan 42, a low pressure compressor ("LPC") 44 and a low pressure turbine ("LPT") 46. The inner shaft 40 may drive the fan 42 directly or through a geared architecture 48 as illustrated in FIG. 1 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and a high pressure turbine ("HPT") 54. A combustor 56 is arranged between the HPC 52 and the HPT 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion. The main engine shafts 40, 50 are supported at a plurality of points by the bearing structures 38 within the static structure 36.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3, and in another example is greater than about 2.5:1. The geared turbofan enables operation of the low spool 30 at higher speeds which can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be understood, however, that the above parameters are only exemplary of one embodiment of a geared architecture engine and that the present disclosure is applicable to other gas turbine engines including direct drive turbofans.

In one embodiment, a significant amount of thrust is provided by the bypass flow path due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of $(``Tram"/518.7)^{0.5}$. The Low Corrected Fan Tip Speed according to one non-limiting embodiment of the example gas turbine engine 20 is less than about 1150 fps (351 m/s).

Figure 3:
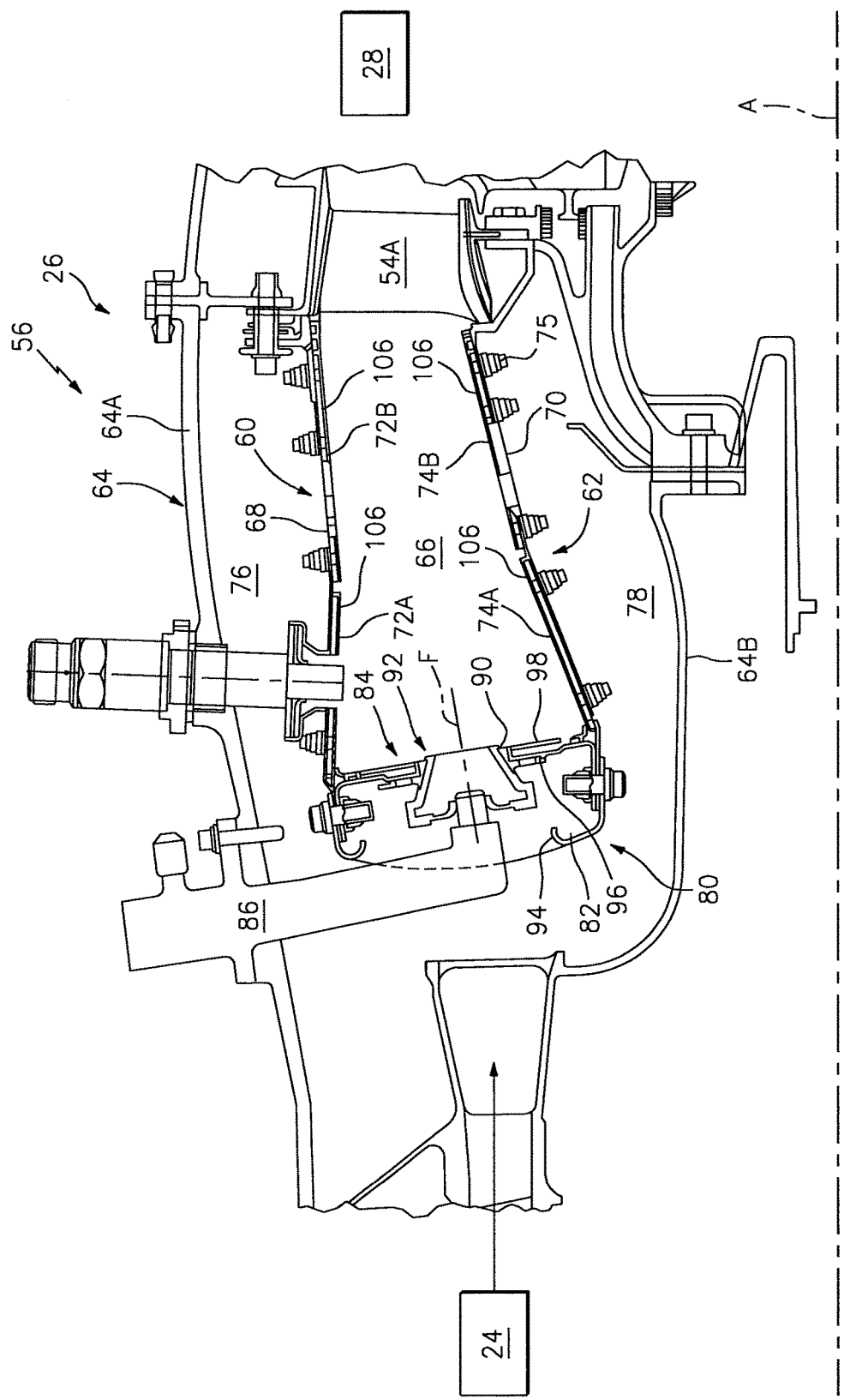
FIG. 3 is an expanded longitudinal schematic sectional view of a combustor section according to one non-limiting embodiment that may be used with the example gas turbine engine architectures shown in FIGS. 1 and 2.

With reference to FIG. 3, the combustor section 26 generally includes a combustor 56 with an outer combustor wall assembly 60, an inner combustor wall assembly 62 and a diffuser case module 64. The outer combustor wall assembly 60 and the inner combustor wall assembly 62 are spaced apart such that a combustion chamber 66 is defined therebetween. The combustion chamber 66 is generally annular in shape to surround the engine central longitudinal axis A.

The outer combustor liner assembly 60 is spaced radially inward from an outer diffuser case 64A of the diffuser case module 64 to define an outer annular plenum 76. The inner combustor liner assembly 62 is spaced radially outward from an inner diffuser case 64B of the diffuser case module 64 to define an inner annular plenum 78. It should be understood that although a particular combustor is illustrated, other combustor types with various combustor liner arrangements will also benefit herefrom. It should be further understood that the disclosed cooling flow paths are but an illustrated embodiment and should not be limited only thereto.

The combustor wall assemblies 60, 62 contain the combustion products for direction toward the turbine section 28. Each combustor wall assembly 60, 62 generally includes a respective support shell 68, 70 which supports one or more liner panels 72, 74 mounted thereto that are arranged to form a liner array. The support shells 68, 70 may be manufactured by, for example, the hydroforming of a sheet metal alloy to provide the generally cylindrical outer shell 68 and inner shell 70. Each of the liner panels 72, 74 may be generally rectilinear with a circumferential arc. The liner panels 72, 74 may be manufactured of, for example, a nickel based super alloy, ceramic or other temperature resistant material. In one disclosed non-limiting embodiment, the liner array includes a multiple of forward liner panels 72A and a multiple of aft liner panels 72B that are circumferentially staggered to line the outer shell 68. A multiple of forward liner panels 74A and a multiple of aft liner panels 74B are circumferentially staggered to line the inner shell 70.

The combustor 56 further includes a forward assembly 80 immediately downstream of the compressor section 24 to receive compressed airflow therefrom. The forward assembly 80 generally includes a cowl 82, a bulkhead assembly 84, and a multiple of swirlers 90 (one shown). Each of the swirlers 90 is circumferentially aligned with one of a multiple of fuel nozzles 86 (one shown) and the respective hood ports 94 to project through the bulkhead assembly 84.

The bulkhead assembly 84 includes a bulkhead support shell 96 secured to the combustor walls 60, 62, and a multiple of circumferentially distributed bulkhead liner panels 98 secured to the bulkhead support shell 96 around the swirler opening. The bulkhead support shell 96 is generally annular and the multiple of circumferentially distributed bulkhead liner panels 98 are segmented, typically one to each fuel nozzle 86 and swirler 90.

The cowl 82 extends radially between, and is secured to, the forwardmost ends of the combustor walls 60, 62. The cowl 82 includes a multiple of circumferentially distributed hood ports 94 that receive one of the respective multiple of fuel nozzles 86 and facilitates the direction of compressed air into the forward end of the combustion chamber 66 through a swirler opening 92. Each fuel nozzle 86 may be secured to the diffuser case module 64 and project through one of the hood ports 94 and through the swirler opening 92 within the respective swirler 90.

The forward assembly 80 introduces core combustion air into the forward section of the combustion chamber 66 while the remainder enters the outer annular plenum 76 and the inner annular plenum 78. The multiple of fuel nozzles 86 and adjacent structure generate a blended fuel-air mixture that supports stable combustion in the combustion chamber 66.

Opposite the forward assembly 80, the outer and inner support shells 68, 70 are mounted to a first row of Nozzle Guide Vanes (NGVs) 54A in the HPT 54. The NGVs 54A are static engine components which direct core airflow combustion gases onto the turbine blades of the first turbine rotor in the turbine section 28 to facilitate the conversion of pressure energy into kinetic energy. The core airflow combustion gases are also accelerated by the NGVs 54A because of their convergent shape and are typically given a "spin" or a "swirl" in the direction of turbine rotor rotation. The turbine rotor blades absorb this energy to drive the turbine rotor at high speed.

Figure 4:
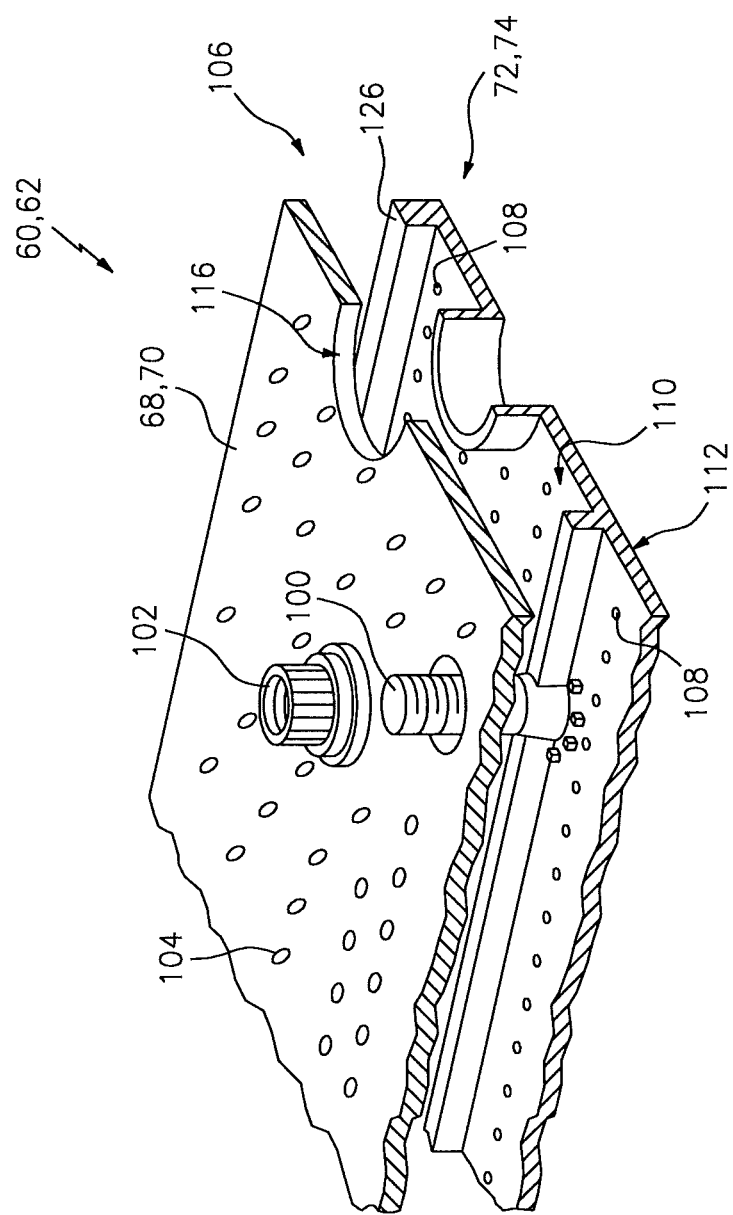
FIG. 4 is an exploded partial sectional view of a portion of a combustor wall assembly.
Figure 5:
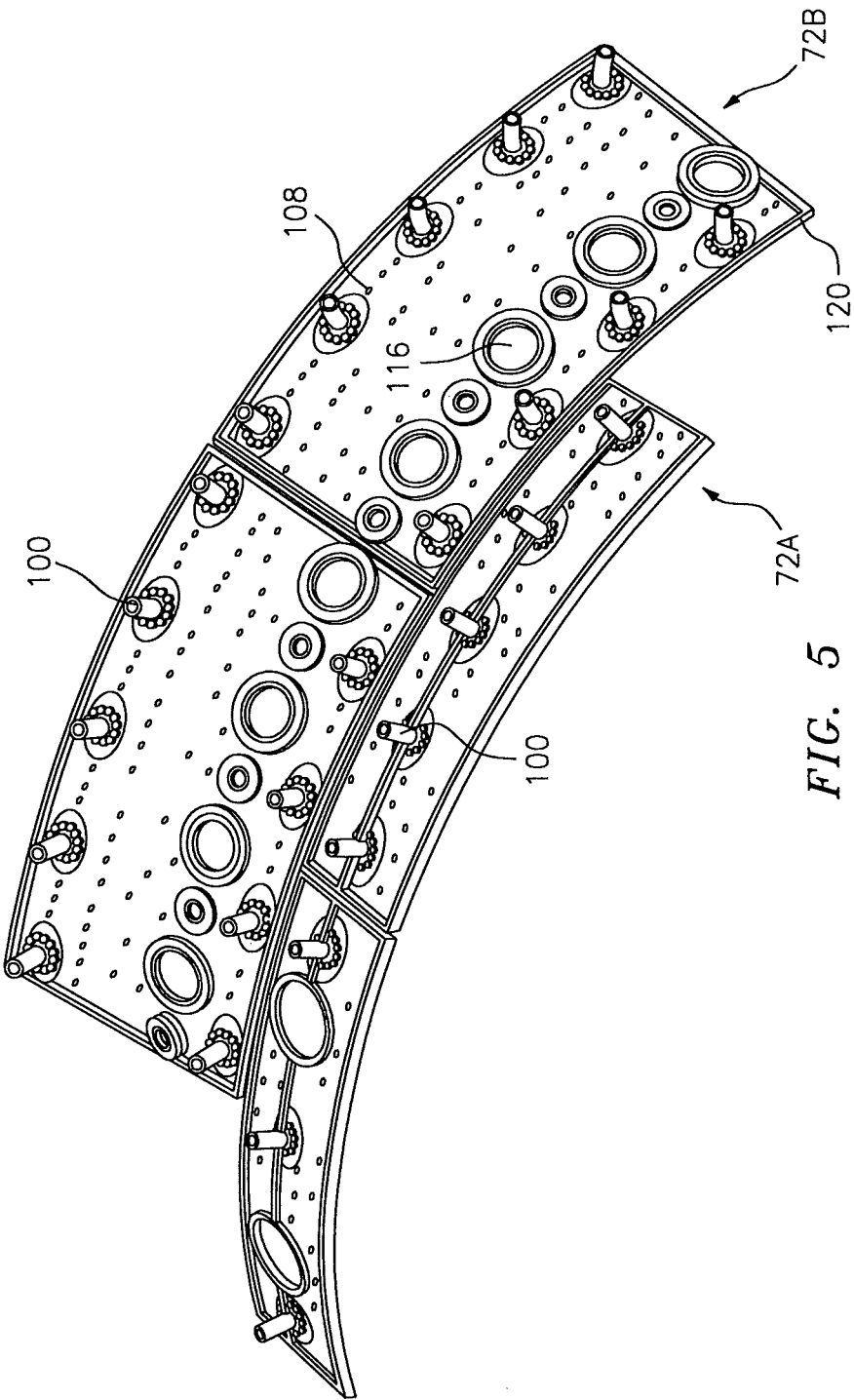
FIG. 5 is a perspective view of a portion of a liner panel array.

With reference to FIG. 4, a multiple of studs 100 extend from each of the liner panels 72, 74 so as to permit an array (see FIG. 5) of the liner panels 72, 74 to be mounted to their respective support shells 68, 70 with fasteners 102 such as nuts. That is, the studs 100 project rigidly from the liner panels 72, 74 and through the respective support shells 68, 70 to receive the fasteners 102 at a threaded section thereof.

A multiple of cooling impingement passages 104 penetrate through the support shells 68, 70 to allow air from the respective annular plenums 76, 78 to enter cavities 106 formed in the combustor walls 60, 62 between the respective support shells. 68, 70 and liner panels 72, 74. The cooling impingement passages 104 are generally normal to the surface of the liner panels 72, 74. The air in the cavities 106 provide cold side impingement cooling of the liner panels 72, 74 that is generally defined herein as heat removal via internal convection.

A multiple of effusion passages 108 penetrate through each of the liner panels 72, 74. The geometry of the passages (e.g., diameter, shape, density, surface angle, incidence angle, etc.) as well as the location of the passages with respect to the high temperature main flow also contributes to effusion film cooling. The combination of impingement passages 104 and effusion passages 108 may be referred to as an Impingement Film Floatwall (IFF) assembly.

The effusion passages 108 allow the air to pass from the cavities 106 defined in part by a cold side 110 of the liner panels 72, 74 to a hot side 112 of the liner panels 72, 74 and thereby facilitate the formation of a thin, cool, insulating blanket or film of cooling air along the hot side 112. The effusion passages 108 are generally more numerous than the impingement passages 104 to promote the development of film cooling along the hot side 112 to sheath the liner panels 72, 74. Film cooling as defined herein is the introduction of a relatively cooler air at one or more discrete locations along a surface exposed to a high temperature environment to protect that surface in the region of the air injection as well as downstream thereof.

A multiple of dilution passages 116 may penetrate through both the respective support shells 68, 70 and liner panels 72, 74 along a common axis. For example only, in a Rich-Quench-Lean (R-Q-L) type combustor, the dilution passages 116 are located downstream of the forward assembly 80 to quench the hot combustion gases within the combustion chamber 66 by direct supply of cooling air from the respective annular plenums 76, 78.

Figure 6:
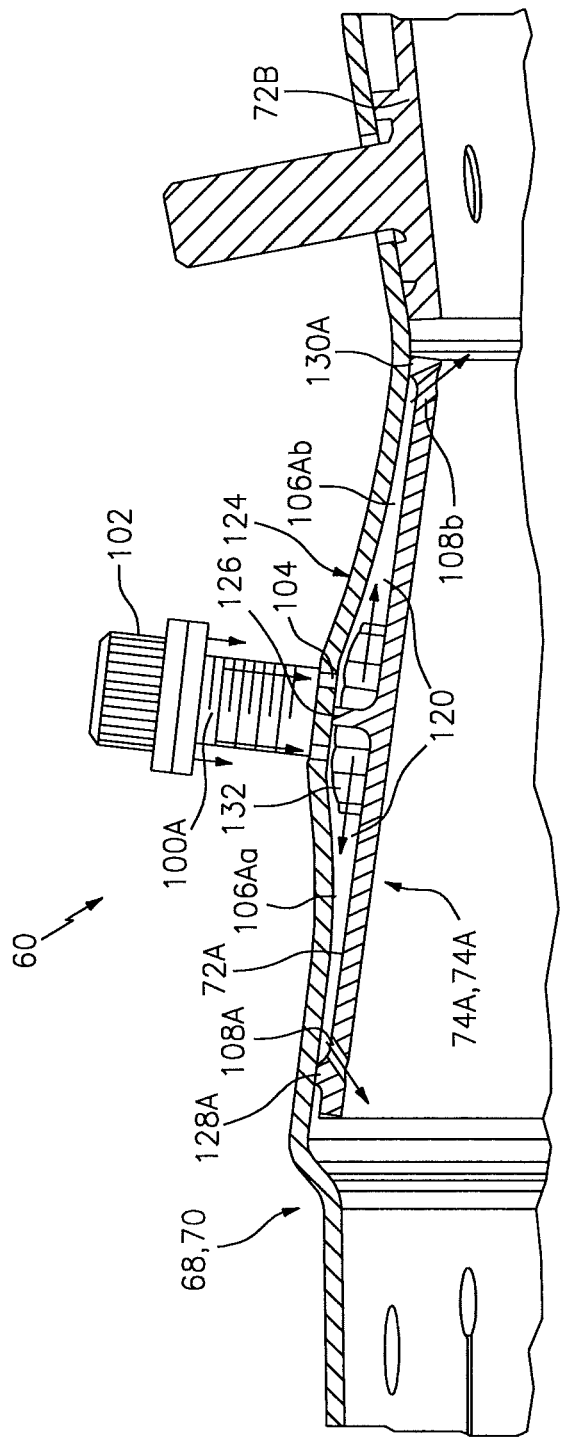
FIG. 6 is an expanded longitudinal sectional view of a forward outer portion of a combustor wall assembly illustrating a contoured region of a support shell according to one disclosed non-limiting embodiment.

With reference to FIG. 6, in one disclosed non-limiting embodiment, each of the respective support shells 68, 70 are at least partially non-parallel with respect to the forward liner panels 72A, 74A to form a convergent passage 120 therebetween along a contoured region 124. That is, the contoured region 124 is a radially displaced profile section of the respective support shells 68, 70. Although the forward liner panels 72A, and the respective forward portion of the outer support shell 68 of the outer wall assembly will be specifically described and illustrated in each of the disclosed non-limiting embodiments, it should be appreciated that the inner support shell 70 and associated forward liner panels 72B of the inner wall assembly may alternatively or additionally benefit herefrom. In addition, various other wall assemblies within a gas turbine engine such as within the walls of the augmentor section 12, the exhaust duct section 14 and the nozzle section 16 (see FIG. 2) may alternatively or additionally benefit herefrom. That is, the contoured region 124 and interface therefor may alternatively or additionally be located within engine sections other than the combustor section 26 which utilize a support shell, liner panel type wall arrangement. The various contoured regions 124 of the support shell 68 form one or more convergent passages 120 for panel cooling air by varying the profile of the combustor shell adjacent to the respective liner panels. Various contours and configurations are possible to tailor the location of the effusion air exit, and optimize heat transfer, pressure loss, manufacturability, NOx reduction, etc. Beneficially, the countered regions do not require additional hardware over conventional float wall combustor panels to create the convergence and are readily produced with current manufacturing methods.

In this disclosed non-limiting embodiment, the contoured region 124 of the support shell 68 defines a hyperbolic cosine (COSH) profile in longitudinal cross-section that extends away from the forward liner panels 72A. That is, the forward liner panels 72A are generally linear in longitudinal cross-section, while the contoured region 124 is non-linear in longitudinal cross-section. For perspective, in this disclosed non-limiting embodiment, each of the forward liner panels 72A define an axial length of about 1.5 inches (38 mm) and each may extend over a circumferential arc of about forty (40) degrees (one shown in FIGS. 7 and 8).

The contoured region 124 is located adjacent to a row of studs 100A and an intermediate circumferential rail 126 is located between a forward circumferential rail 128 and an aft circumferential rail 130. Each of the studs 100A may be at least partially surrounded by posts 132 to at least partially support and operate as stand-offs between the support shell 68 and the forward liner panels 72A.

Figure 7:
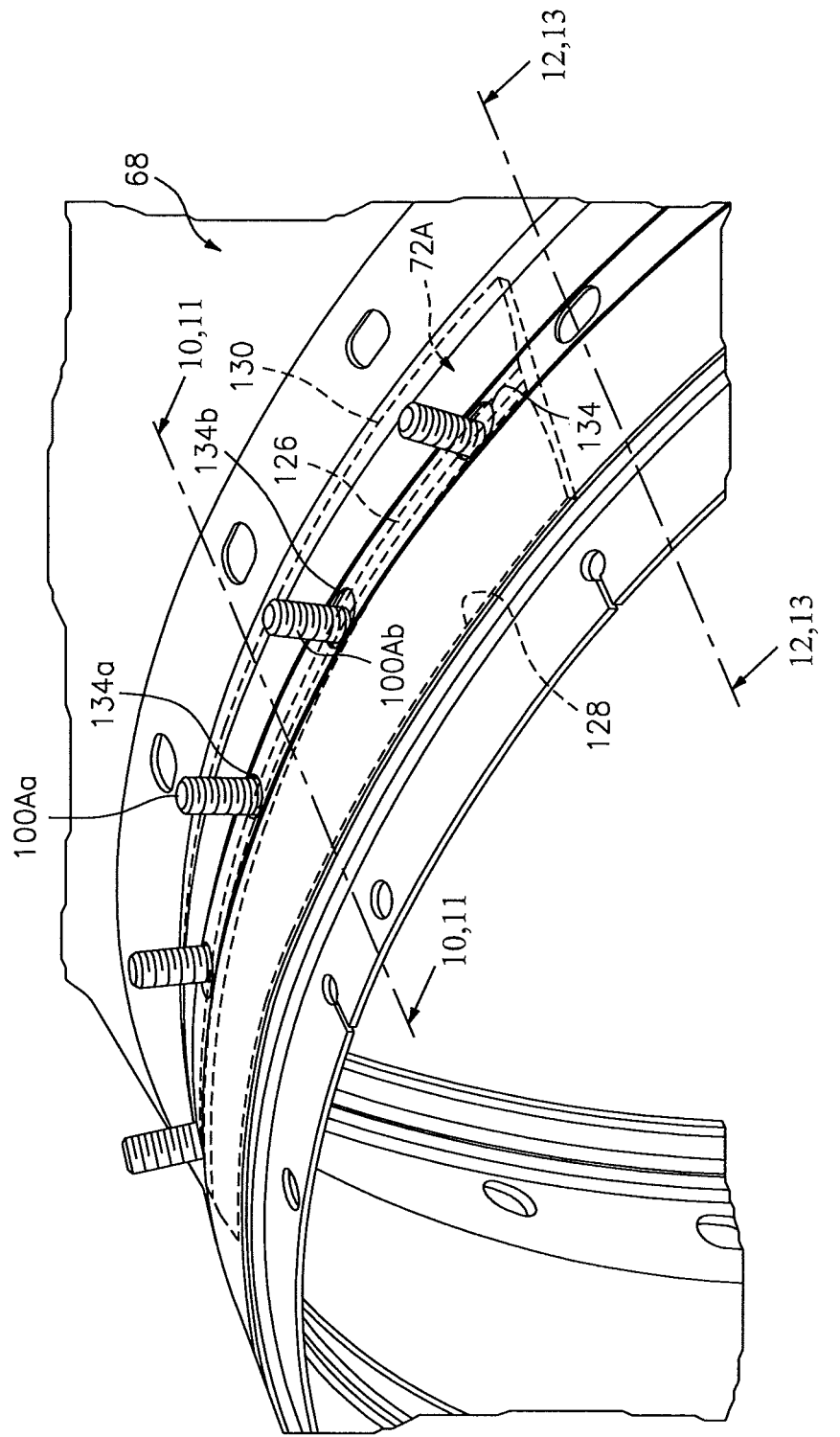
FIG. 7 is a perspective partial view of one forward outer liner panel mounted to a support shell.

With reference to FIG. 7, each of the forward liner panels 72A, in one disclosed non-limiting embodiment, includes a single row of studs 100A (five shown) that extend through respective stud apertures 134 in the support shell 68. A center or "king" stud 100Aa is received within a central circular stud aperture 134a while the remainder of the studs 100Ab are received within elongated apertures 134b to facilitate operational thermal growth relative to the center or "king" stud 100Aa (see FIG. 7).

With continued reference to FIG. 6, the contoured region 124 forms a cavity 106A that converges toward the forward circumferential rail 128 and the aft circumferential rail 130. The cavity 106A is further subdivided by the intermediate circumferential rail 126 into a forward cavity 106Aa and an aft cavity 106Ab. The forward cavity 106Aa and the aft cavity 106Ab thereby accelerate and direct impingement airflow from impingement passages 104 on each respective side of the intermediate circumferential rail 126 toward forward effusion apertures 108a and aft effusion apertures 108b. The forward effusion apertures 108a and the aft effusion apertures 108b may define respective angles through the forward liner panels 72A to direct effusion airflow generally forward and aft into the combustion chamber 66. It should be appreciated that various contours and configurations are possible to tailor the location of the effusion air passages to optimize heat transfer, pressure loss, manufacturability, etc., without need for additional hardware between the respective support shell and the liner panels.

Figure 8:
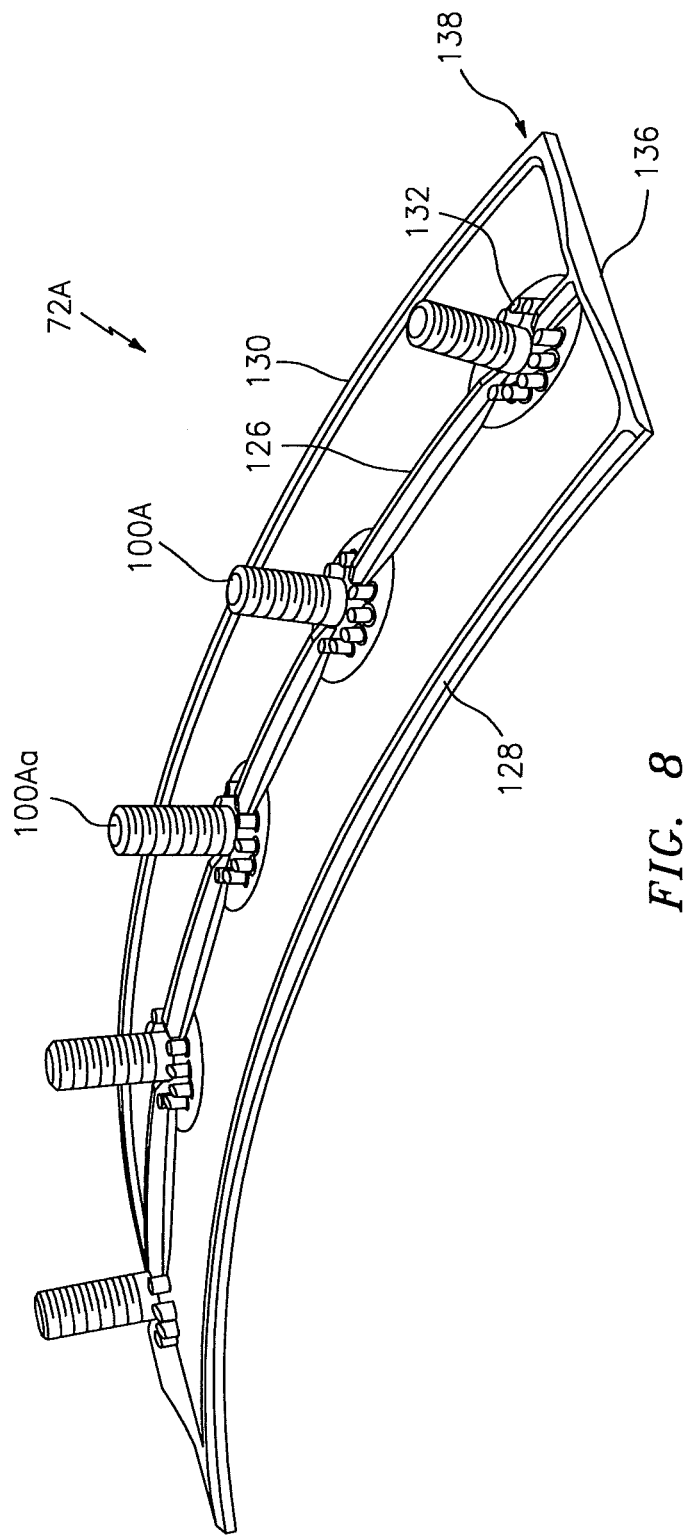
FIG. 8 is a perspective view of a forward outer liner panel of a combustor wall assembly according to one disclosed non-limiting embodiment.
Figure 9:
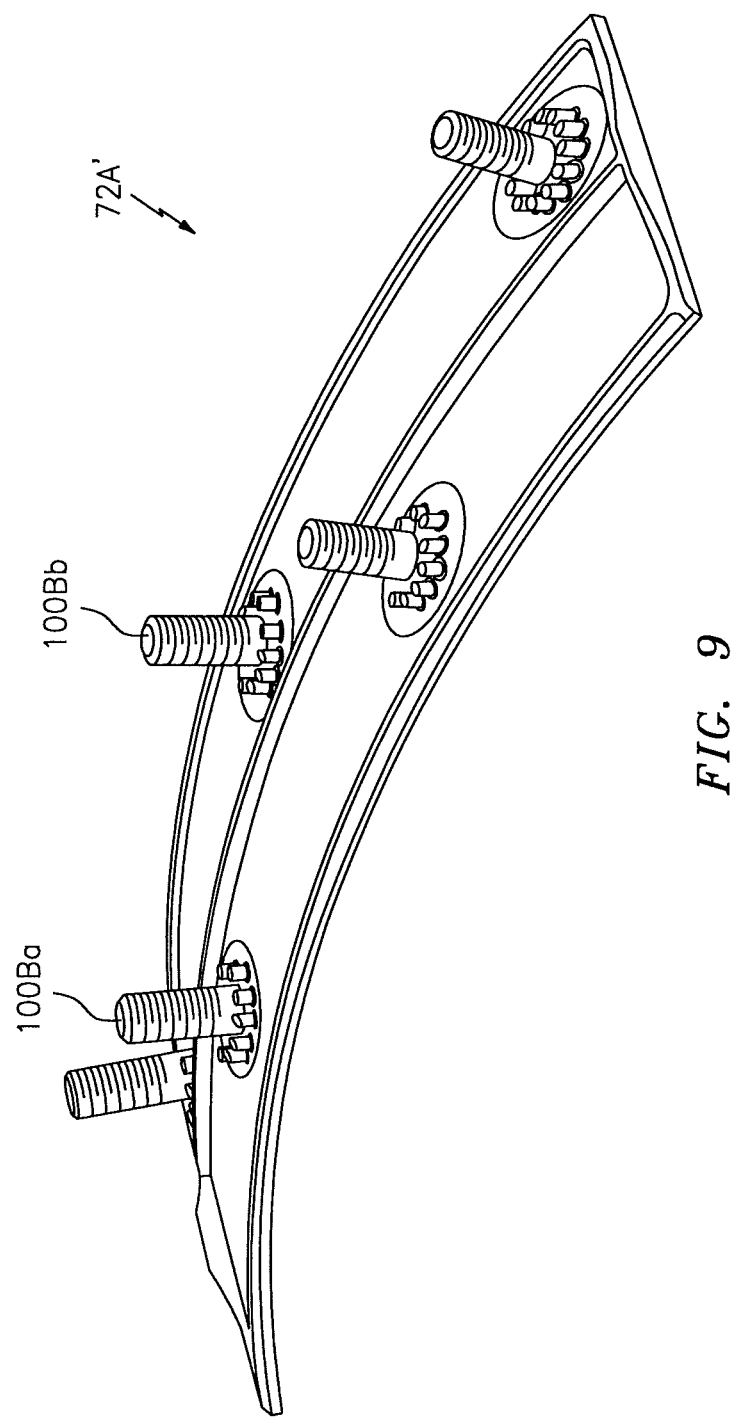
FIG. 9 is a perspective view of a forward outer liner panel of a combustor wall assembly according to another disclosed non-limiting embodiment.

With reference to FIG. 8, in one disclosed non-limiting embodiment, the multiple of studs 100A extend generally along the intermediate rail 126. That is, the studs 100A are axially aligned with, and may at least partially form, the intermediate rail 126. In another disclosed non-limiting embodiment, a forward row of studs 100Ba extend from the cold side 110 on one side of the intermediate rail 126 and a second row of studs 100Bb that extend from the cold side 110 on a side of the intermediate rail 126 opposite the forward row of studs 100Ba (see FIG. 9).

End rails 136 circumferentially close-out each forward liner panels 72A with respect to the support shell 68. That is, the forward circumferential rail 128 and the aft circumferential rail 130 are located at relatively constant curvature axial interfaces while the end rails 136 extend across an axial length of the support shell 68 to complete a perimeter rail 138 that seals the periphery of each forward liner panels 72A with respect to the respective support shell 68.

With reference to FIG. 10, the intermediate rail 126 extends from the cold side 110 with respect to the forward circumferential rail 128, the aft circumferential rail 130 and the end rails 136. The intermediate rail 126 may extend for a lesser distance from the cold side 110 to form an offset with respect to the contoured region 124. The intermediate rail 126 extends from the cold side 110 and is offset from the support shell 68 when the contoured region is in a first position and contacts the support shell 68 when the contoured region is in a second deformed/deflected position. The intermediate rail 126 thereby forms a gap G (e.g., a preassembly gap) that will cause the forward liner panels 72A and the respective support shell 68 to deflect toward each other as the fasteners 102 are tightened onto the studs 100 to close the gap G (see FIG. 11). It should be appreciated that fasteners such as clips and mechanisms other than threads may alternatively or additionally be utilized.

As the fasteners 102 are tightened onto the studs 100, the attachment at least partially elastically deflects the support shell 68 adjacent to the intermediate rail 126 and produces a tight seal between the perimeter rail 138 and the support shell 68 to assure an effective seal therebetween (See FIGS. 11 and 13). The elastic deformation of the support shell 68 to seal with the intermediate rail 126 reduces—or eliminates—leakage to facilitate formation of relatively large pressure drops across the liner panels 72, 74 and thereby increase cooling effectiveness.

With reference to FIG. 12, each end rail 136 and the contoured region 124 define a respective rail profile 140 and support shell profile 142 contoured to form the gap G prior to engagement of the fasteners 102. That is, the rail profile 140 of the end rails 136 and the support shell profile 142 of the contoured region 124 are of a slightly different profile such that the gap G is located in an area 150 generally axially adjacent to the intermediate rail 126 to form respective axial engagement areas 152A, 152B to provide a sliding engagement adjacent to the forward circumferential rail 128 and the aft circumferential rail 130 (See FIGS. 10 and 11). That is, the support shell profile 142 slides along the respective axial engagement areas 152A, 152B as the fasteners 102 are engaged. In one example, the gap G is about 0.005-0.020 inches (0.1-0.5 mm). It should be further appreciated that the intermediate rail 126 may be of the same height from the cold side 110 as the forward circumferential rail 128 and the aft circumferential rail 130 or alternatively, of a lesser height to further facilitate formation of the gap G.

The gap G is closed in response to deflection of the contoured region 124 as the fasteners 102 are tightened onto the studs 100 (see FIG. 13). As the fasteners 102 are tightened down, they slightly deform the sheet metal support shell 68 against the rails. That is, tightening of the fasteners 102 closes the gap G such that the contoured region 124 closely follows the end rails 136 to circumferentially close-out and form an interference fit between each of the forward liner panels 72A with respect to the associated support shell 68.

This interference fit ensures an effective seals that reduces leakage to facilitate formation of a relatively larger pressure drops across the liner panels 72, 74 and increase cooling effectiveness.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the features within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A wall assembly for a gas turbine engine, comprising:
a support shell with a contoured region defining an aperture for receiving a stud; and
a multiple of liner panels mounted to the support shell, at least one of the multiple of liner panels including an end rail, and the contoured region deformable via a fastener engaging the contoured region to contact at least a portion of the end rail.

2. The wall assembly as recited in claim 1, wherein the portion of the end rail and the contoured region of the support shell define a gap when the contoured region is in a first position.

3. The wall assembly as recited in claim 2, wherein the portion of the end rail and the contoured region of the support shell form a seal when the contoured region is in a second position.

4. The wall assembly as recited in claim 1, wherein the contoured region is centered with respect to an intermediate circumferential rail of the at least one of the multiple of liner panels.

5. The wall assembly as recited in claim 4, further comprising a perimeter rail that defines a first height from a cold side of the at least one liner panel, the intermediate rail defines a second height from the cold side, the second height less than the first height.

6. The wall assembly as recited in claim 5, further comprising a multiple of studs that extend from each of the multiple of liner panels.

7. The wall assembly as recited in claim 6, wherein the multiple of studs extend from the at least one of the multiple of liner panels along the intermediate circumferential rail.

8. A wall assembly for a gas turbine engine, comprising:
a support shell with at least one contoured region defining an aperture for receiving a stud;
a multiple of liner panels mounted to the support shell, at least one of the multiple of liner panels including a first end rail and a second end rail; and
a multiple of fasteners mounted to the at least one of the multiple of liner panels, each of the multiple of fasteners operable to deform via engagement of at least one of the multiple of fasteners with a respective one of the at least one contoured region to seal the support shell to the first and the second end rails.

9. The wall assembly as recited in claim 8, further comprising a multiple of studs that extend from the at least one of the multiple of liner panels through the support shell, each of the multiple of fasteners respectively received onto one of the multiple of studs.

10. The wall assembly as recited in claim 8, wherein the contoured region is aligned with respect to an intermediate circumferential rail of the at least one of the multiple of liner panels.

11. The wall assembly as recited in claim 8, wherein the liner panel is mounted within a combustor of the gas turbine engine.

12. The wall assembly as recited in claim 8, wherein the first and the second end rails form a portion of a perimeter rail.

13. The wall assembly as recited in claim 12, wherein the perimeter rail surrounds an intermediate rail.

14. The wall assembly as recited in claim 13, wherein the perimeter rail includes a forward circumferential rail and an aft circumferential rail connected to the first and the second end rails, the first and the second end rails each includes an engagement area in contact with the support shell when the contoured region of the support shell is in a first position and when the contoured region is in a second position sealed with the first and second end rail.

15. The wall assembly as recited in claim 14, wherein the intermediate rail is parallel to the forward circumferential rail and the aft circumferential rail.

16. The wall assembly as recited in claim 15, wherein the intermediate rail extends less than the forward circumferential rail and the aft circumferential rail by 0.005-0.020 inches (0.1-0.5 mm).

17. A method of assembling a wall assembly within a gas turbine engine, the method comprising:
   locating a stud that extends from a cold side of a liner panel through a support shell including a contoured region defining an aperture for receiving the stud; and
   attaching a fastener onto the stud and at least partially closing a gap between the panel and the shell via the fastener.

18. The method as recited in claim 17, wherein the at least partially closing the gap comprises elastically deforming the support shell toward the liner panel.

19. The method as recited in claim 17, wherein the panel includes a rail, and wherein the rail and the contoured region define a gap when the contoured region is in a first position and contact one another when the contoured region is in a second position.

20. The method as recited in claim 17, further comprising defining the gap adjacent to an intermediate rail.

* * * * *